United States Patent

Bonfilio et al.

[11] Patent Number: 5,384,948
[45] Date of Patent: Jan. 31, 1995

[54] METHOD OF ASSEMBLING A TRANSVERSE PLATE WITH A CROWN RING OF A TORSION DAMPER

[75] Inventors: Ciriaco Bonfilio, Clichy; Dieter Röhrle, Montmorency, both of France

[73] Assignee: Valeo, Paris, France

[21] Appl. No.: 119,834

[22] Filed: Sep. 13, 1993

[30] Foreign Application Priority Data

Sep. 15, 1992 [FR] France .................. 92 10958

[51] Int. Cl.⁶ .................. B23P 11/02; B23P 19/02; F16F 7/02
[52] U.S. Cl. .................. 29/520; 29/436; 29/521; 29/522.1; 74/574; 403/278
[58] Field of Search .................. 29/434, 436, 446, 451, 29/514, 520, 521, 522.1, 523, 524; 74/573 F, 574; 403/278; 464/89; 188/379

[56] References Cited

U.S. PATENT DOCUMENTS

| 3,559,946 | 2/1971 | Baxter, Jr. | 29/521 X |
| 3,716,901 | 2/1973 | Bragg et al. | 29/436 X |
| 4,187,597 | 2/1980 | Bremer, Jr. | 29/446 X |
| 4,378,865 | 4/1983 | McLean | 29/451 X |
| 4,392,296 | 7/1983 | Kanamaru et al. | 403/278 X |
| 4,783,895 | 11/1988 | Reik | 74/573 F X |
| 5,237,733 | 8/1993 | Ladouceur et al. | 29/523 X |

FOREIGN PATENT DOCUMENTS

| 2655095 | 5/1991 | France . |
| 2038682 | 7/1980 | United Kingdom . |
| 2059838 | 4/1981 | United Kingdom . |

*Primary Examiner*—Peter Dungba Vo
*Attorney, Agent, or Firm*—Longacre & White

[57] ABSTRACT

An assembly of two components comprises a male member and a female member, the latter having a shoulder, with the male member abutted against the shoulder in back-to-back relationship. The female member has a groove. The male member is worked so as to cause its material to invade at least part of this groove in plastic flow. The groove is located beside the periphery of the shoulder having the larger diameter (i.e. the outer periphery of the shoulder), so that the plastic flow of the material of the male member takes place radially outwardly. Arrangements are also provided for sealing the assembly of the two components. The invention is applicable, for example, to torsion dampers for motor vehicles.

7 Claims, 2 Drawing Sheets

METHOD OF ASSEMBLING A TRANSVERSE PLATE WITH A CROWN RING OF A TORSION DAMPER

FIELD OF THE INVENTION

This invention relates to methods of assembling together two coaxial components, namely a male member and a female member, in such a way that the male member is engaged on a generally transverse or radial shoulder of the female member in back-to-back relationship, the two members being then secured together both axially and circumferentially.

One typical, but non-limiting, example of an assembly consisting of two such components is the primary part of a torsion damper which comprises two coaxial parts, namely the said primary part and a secondary part. Such a primary part comprises an axially elongated crown ring, together with two transverse plates which are secured to each other, and which are spaced apart from each other. In this connection, the crown ring may constitute the female member, with at least one of the two said plates constituting the associated male member.

BACKGROUND OF THE INVENTION

In the specification of French granted patent FR 2 655 095B1, it was proposed that two components should be assembled together by preforming on a female member at least one groove portion defining a concavity which was oriented radially beside the shoulder of the female member, the groove portion being circumferentially elongated. A male member was then applied against the shoulder of the female member, and was subjected to working such that some of the material of the male member was caused to invade at least part of the groove portion in the female member in plastic flow.

In the above mentioned French patent, the groove portion in the female member extended beside the periphery of the shoulder having the larger diameter, the shoulder being generally annular in shape so that the said periphery was its outer periphery; and the concavity of the profile of the groove portion was oriented radially away from the axis of the assembly (i.e. the common axis of the two components once they were assembled together). That arrangement is such that the plastic flow of the material of the male member into the groove portion or portions takes place radially inwardly, i.e. away from the said periphery of the shoulder and towards the common axis. The female member is therefore provided with a plurality of elongated groove portions disposed from place to place circumferentially and alternating with axially elongated grooves; the working of the male member is performed in such a way that its material invades at least part of each said groove portion and at least part of each axially elongated groove, in plastic flow.

That method of assembly is satisfactory in numerous applications, especially when the assembly is to constitute a friction plate of a clutch, or a pulley of a speed varying device, in particular for a motor vehicle. The method is, as will be clear from the foregoing, carried out on the smaller, or inner, periphery of the male member concerned. However, such a method is not normally suitable for making the primary part of a torsion damper, in particular for a motor vehicle, especially in the case in which some degree of sealing has to be provided in the resulting assembly. The reason for this is partly that it would then be necessary to carry out the working or upsetting operation on the larger or outer periphery of the male member.

DISCUSSION OF THE INVENTION

An object of the invention is to provide a method of assembly which is satisfactory in such a case.

According to the invention, a method for assembling two coaxial components together, one of which, here referred to as the male member, is to be abutted back-to-back with a generally radial shoulder of the other one of the said components, here referred to as the female member, while being secured to the latter both axially and circumferentially, wherein the said method comprises: preforming on the female member at least one groove portion having a concave profile oriented radially beside the shoulder of the female member, the said groove portion being circumferentially elongated; and, after applying the male member against the said shoulder, working the said male member so as to cause its material in plastic flow, to invade at least partially, the said groove portion in the female member, is characterised in that, firstly, the groove portion in the female member is formed beside the radially outermost periphery of the said shoulder (i.e. the periphery thereof having the larger diameter), by orienting the concavity of the said profile radially towards the axis of the assembly so that the plastic flow of the material of the male member into the groove portion takes place radially away from the said axis and towards the periphery; and secondly, means are provided such as to provide sealing of the assembly thus made.

In one type of embodiment of the invention, the said means for ensuring sealing of the assembly comprise, at least partly, forming the said groove portion with a continuous circumferential extension of the said groove portion in the female member, so that it encircles the axis of the assembly completely in the form of an uninterrupted groove.

Alternatively or in addition, at least one sealing ring may be inserted between the male member and the female member. In every case, good sealing is obtained, and in addition, a good torque transmission capacity is achieved between the male and female members.

It may appear that there is some contradiction in a method in which material is caused to flow in the plastic state radially outwardly when such sealing is required. In this connection, this plastic flow corresponds to an expansion of the material, and it would normally be expected that some voids or gaps, giving imperfect sealing, would occur. The fluid flow in the method according to the invention is therefore not effected without overcoming a certain prejudice when, as in this case, the final assembly must be leak-tight to a greater or lesser extent even though the operation is carried out on the outer periphery of the male member.

The various features and advantages of the invention will appear more clearly on a reading of the description of preferred embodiments which is given below, by way of example only and with reference to the accompanying diagrammatic drawings.

DESCRIPTION OF PREFERRED EMBODIMENTS OF THE INVENTION

Figure 1:
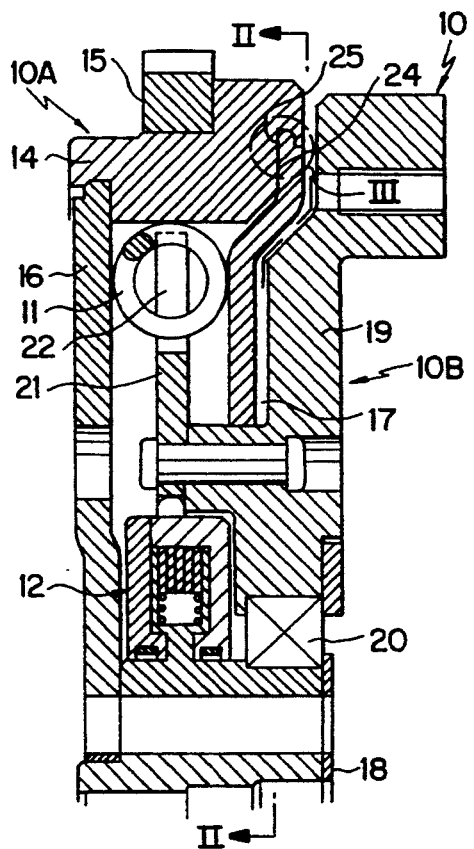
FIG. 1 is a view in axial cross section showing part of a torsion damper which includes a sub-assembly of two components assembled together in accordance with the invention.
Figure 2:
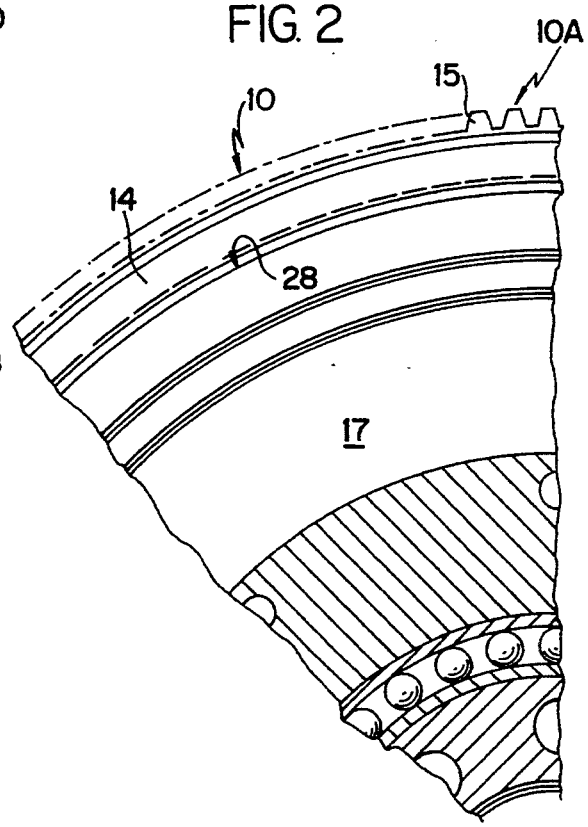
FIG. 2 is a view in transverse cross section of part of the same torsion damper, taken on the broken line II—II in FIG. 1.

FIGS. 1 and 2 show a torsion damper 10, which need not be described in full detail here. However, it will be mentioned that this torsion damper includes a primary part 10A, together with a secondary part 10B which is coaxial with the primary part 10A. The secondary part 10B is mounted for rotation with respect to the primary part 10A against the action of resilient means 11 which act circumferentially. This relative rotation is partially resisted by damping means 12 which are part of the torsion damper.

The primary part 10A in this example comprises a crown ring 14 which is elongated axially, and which carries (externally in this embodiment) a starting crown 14; together with two transverse plates 16 and 17 which are fixed to the crown ring 14 and extend parallel to each other. The two plates 16 and 17 are spaced apart from each other, and one of them, namely the plate 16, defines a base and is fixed to a hub 18. The other plate 17 is in the form of a cover plate.

In this example, the secondary part 10B of the torsion damper consists simply of a further plate 19 which is mounted on the hub 18, on which it is rotatable, by means of a rolling bearing 20. A radial damper plate 21 is secured (by riveting in this example) to the plate 19. This plate 19 is arranged to constitute the reaction plate of a clutch. It is arranged to be coupled in rotation to the primary shaft of the gearbox of the vehicle, through the clutch friction wheel, or clutch disc, of the clutch. The primary part 10A of the torsion damper is similarly arranged to be coupled in rotation to the crankshaft of the engine of the vehicle, by means of screws (not shown), each of which passes through a respective aperture (shown in FIG. 1) formed in the hub 18 and base plate 16.

The damper plate 21 is arranged axially between the base plate 16 and cover plate 17 of the primary part 10A of the torsion damper, and is formed with arms 22 which extend radially between the resilient means 11, which consist of a set of resilient members 11 in the form (in this example) of springs of the coil spring type. These springs are of substantial length, and act circumferentially between the damper plate 21 of the secondary part 10B of the torsion damper on the one hand, and thrust pads (not shown in the drawings) on the other, these thrust pads being fixed to the base plate and cover plate 17 of the primary part 10A.

At least one of the two plates 16 and 17 of the primary part 10A is a component which is initially separate from the crown ring 14. It is however to be assembled coaxially to the crown ring 14. The same is true in FIGS. 1 and 2 for both of the two plates 16 and 17.

In the remainder of this description, only the method of assembly of the cover plate 17 with the crown ring 14 will be described, it being understood that the method is the same in respect of the base plate 16. For convenience of description, it will be assumed that the crown ring 14 is in the form of a female component, for cooperation with the cover plate 17 constituting a male component.

The crown ring 14 has an annular shoulder 24 which is disposed generally radially, with the cover plate 17 having an outer peripheral portion of larger diameter than the shoulder 24, abutting on the latter. In this connection, the cover plate 17 must be secured to the crown ring 14 both axially and circumferentially.

In a known manner, the shoulder 24 of the crown ring 14 defines the base of a recess 25 in which the cover plate 17 is engaged axially. On the side wall of this recess 25, the crown ring 14 has at least one groove portion 26 (see FIG. 3), the concavity, or concave profile, of which is oriented radially beside the shoulder 24. The groove portion 26 is elongated circumferentially; and, after the cover plate 17 has been applied against the shoulder 24, the cover plate is subjected to working (in practice by application of an axial force), so as to upset the material at its outer periphery. This causes plastic flow of the material of the cover plate 17 to occur in a radial direction, so that it fills at least part of the groove portion 26.

The groove portion 26 of the crown ring 14 is disposed beside the outer periphery of the shoulder 24, i.e. the periphery of the latter which has the greatest diameter. The concavity of its profile is oriented radially inwardly, i.e. towards the axis of the assembly, so that the plastic flow of the material of the cover plate 17 into the groove portion 26 takes place radially outwardly, i.e. away from the axis of the assembly and towards the periphery of the assembly. In addition, means are provided such as to ensure that the assembly thus formed is fully sealed.

In the various embodiments shown in FIGS. 1 to 11 inclusive, these last mentioned means at least partly comprise making a continuous circumferential extension of the groove portion 26 of the crown ring 14 around the axis of the assembly, in the form of an interrupted groove which, for convenience, is designated here by the same reference numeral 26.

Figure 3:
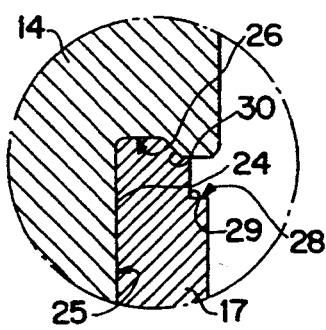
FIG. 3 repeats on a larger scale the detail of FIG. 1 indicated at III in FIG. 1.

In such a case, and as shown, the force applied to the cover plate 17 in order to work it in plastic flow leaves a "scar", in the form of a groove 28 which extends as a continuous circle on the external surface of the cover plate 17 and at the periphery of the latter, as can be seen for example in FIG. 3.

Figure 4:
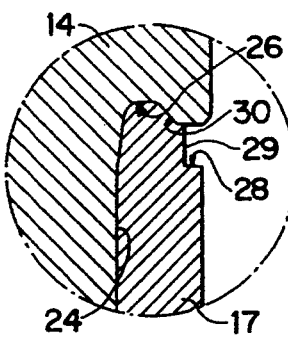
FIGS. 4 through 11 are views similar to FIG. 3, each showing a respective modified embodiment.

The base 29 of this groove 28 may extend at right angles to the axis of the assembly as in FIGS. 3 and 4. However, in modified versions it may be oblique to this axis as in FIG. 5, so that the nearer the radially inner edge of the base 29 is to the axis of the assembly, the closer will it be to the shoulder 24.

Figure 5:
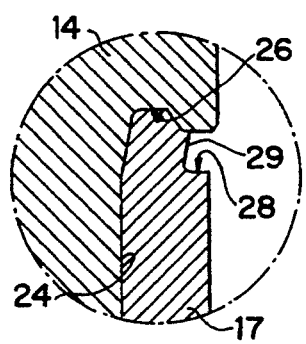

In FIGS. 3 to 5, it can be seen that the cover plate 17 is relatively thin.

The groove portion 26 of the crown ring 14 extends beside the edge of the shoulder 24 of the latter so as to form a continuation of this shoulder. In other words, the flank of the groove portion 26 is defined, on the same side of the latter as the shoulder 24, by the shoulder itself. On the side of the groove portion 26 opposite to the shoulder 24, the flank 30 of the groove portion 26 is oblique, so that it extends away from the shoulder 24 by an amount which depends on the inward radial extent of the groove portion 26.

Thus, in FIG. 3, the shoulder 24 extends entirely at right angles to the axis of the assembly. However, in FIGS. 4 and 5, a peripheral fraction of the shoulder 24 extends obliquely with respect to the axis of the assembly, from the base of the groove portion 26, so that this peripheral fraction of the shoulder is spaced away from the other flank 30 of the groove portion 26 by an amount which increases in inverse relationship with its distance from the axis of the assembly. This inclination to the radial plane assists retention of the cover plate 17 while the latter is being worked in plastic flow, and resists any deflection of the cover plate. It also assists sealing and good torque transmission capability, by directing the plastic flow of material towards the groove portion 26 during the working operation, so as to lead to proper filling of the groove portion 26.

In FIGS. 6 to 11 inclusive, the cover plate 17 is relatively thick, and means of the same type as those illustrated by way of example in FIGS. 3 to 5 are provided for the purpose of ensuring proper sealing. Thus in FIG. 6, the groove portion 26 extends, as before, continuously with the shoulder 24. However, its axial extent is less than one half of that of the side wall of the recess 25 of the crown ring 14.

Figure 7:
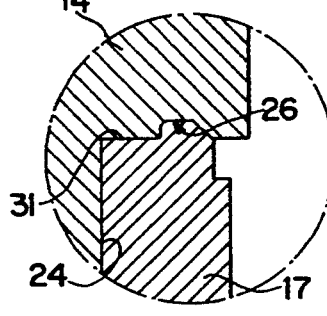

In FIG. 7, the groove portion 26 is spaced away from the shoulder 24.

Figure 6:
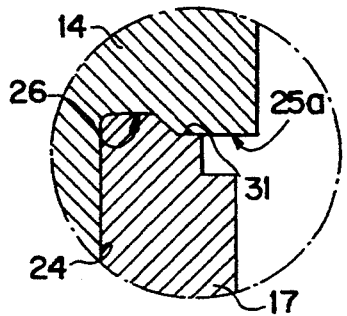

In both of FIGS. 6 and 7, a cylindrical surface 31 is provided on the peripheral face of the cover plate 17, so as to assist in centring.

Figure 8:
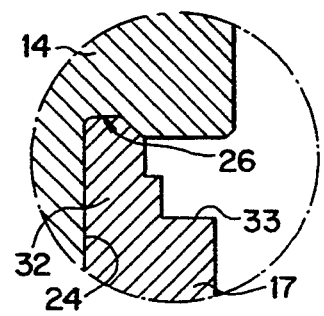

In FIG. 8, the cover plate 17 has a portion 32 of reduced thickness at its periphery for its assembly to the crown ring 14. This thickened portion 32 is the only portion which is subjected to working in plastic flow. The portion 32 of reduced thickness is delimited axially by a cylindrical surface 33 which, in FIG. 8, extends inwardly from the external surface, seen at the right hand side of the FIG., of the cover plate 17. It will be noted that the same applies in FIG. 11.

Figure 10:
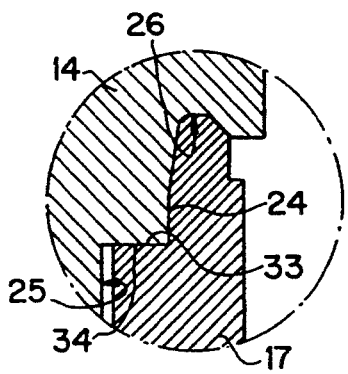

However, by contrast, and referring to FIG. 10, the surface 33 here extends axially from the inner surface of the cover plate 17, i.e. the left hand radial surface of the latter in the FIG. The base of the recess 25 of the crown ring then, itself, has a corresponding rebate 34 which defines the inner radial edge of the shoulder 24.

Figure 9:
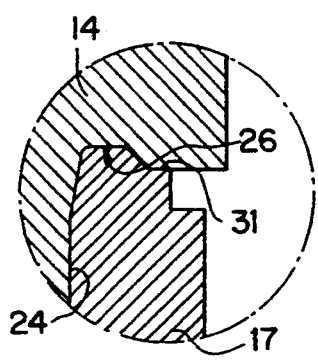
Figure 11:
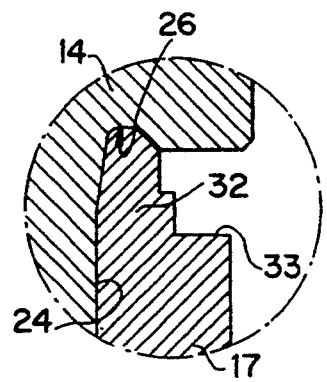

In addition, in FIGS. 10 and 11, the peripheral fraction, mentioned above, of the shoulder 24 extends obliquely as in FIGS. 4 and 5, and the same is true in FIG. 9. FIG. 9 is also concerned with an embodiment of the same type as that shown in FIG. 6. It will be noted that the axial dimension of the groove portion 26 in FIGS. 10 and 11 is smaller than that in FIG. 9.

Figure 12:
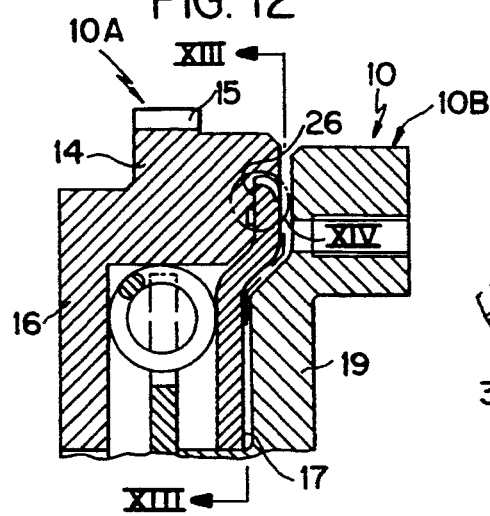
FIG. 12 is a view similar to FIG. 1 but illustrating a further embodiment of the invention.
Figure 13:
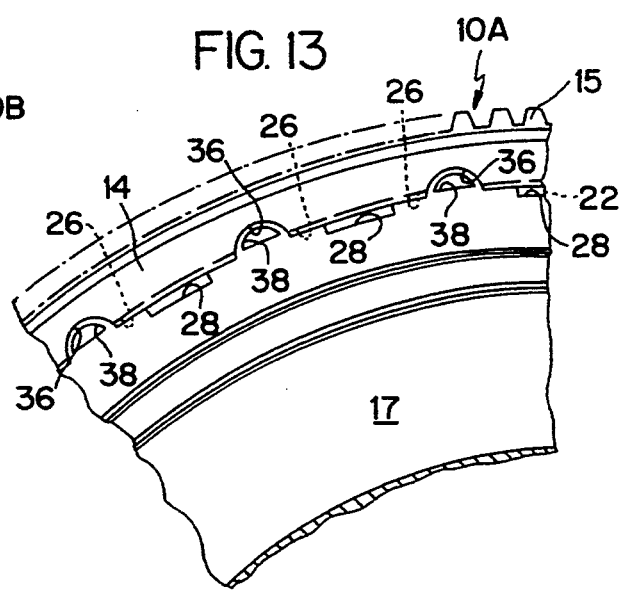
FIG. 13 is a view similar to FIG. 2, its cross section being taken on the line XIII—XIII in FIG. 12 and showing the same modified embodiment as the latter.
Figure 14:
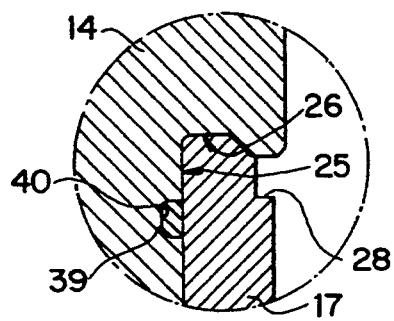
FIG. 14 repeats on a larger scale the detail of FIG. 12 indicated at XIV in FIG. 12.

Referring now to FIGS. 12 to 14, the base plate 16 is here integral with the crown ring 14, instead of being a separate component as in the preceding Figures. Thus, in this case, it is only the cover plate 17 that constitutes a male component, which is assembled to the female component constituted by the crown ring 14 by working in plastic flow. This operation is carried out in the same way as in the foregoing examples.

However, in a modification to the method within the present invention, the crown ring 14 is no longer formed with a continuous circular groove portion 26, but instead has a plurality of groove portions 26 which are elongated circumferentially from place to place, with at least one axially elongated groove 36 between two of these groove portions 26. The operation of working in plastic flow is carried out in such a way that the material of the cover plate 17 then invades at least part of the groove 36.

In this example, the crown ring 14 has a series of groove portions 26 arranged alternately with grooves 36. The grooves 36 are in the form of notches which extend over the whole radial depth of the lateral wall of the recess 25 of the crown ring 14, in which the cover plate 17 is engaged. Each notch 36 is concave towards the axis of the assembly.

In this example the notches 36 have a transverse cross section with a rounded profile in the form of a semicircle, and each of the groove portions 26 extends respectively from one notch 36 to the next.

The above mentioned working operation applied to the cover plate 17 gives rise to discontinuous hollow scars or dimples on the external surface of the cover plate. Each of these dimples comprises, firstly, in line with each groove portion 26, a groove portion 28 which extends circumferentially over the whole or part of the length of the corresponding groove portion 26; and secondly, a half-moon shaped recess 36 in line with each notch 36, with the half-moon contour of each recess 38 matching the corresponding notch 36 but being spaced from it as can be seen in FIG. 13.

In conjunction with the foregoing, the means which are provided for the purpose of sealing of the assembly constructed as above involve at least partly the use of at least one sealing ring between the cover plate 17 and crown ring 14. In FIGS. 12 to 14, a sealing ring 39, for example of the O-ring type, is arranged in a groove 40 which has its concavity oriented axially, and which is provided for this purpose on either one of the components comprising the cover plate 17, and crown ring 14. In this example, as shown, the groove 40 is formed on the crown ring 14, as a recess in the radial shoulder of the recess 25.

Figure 15:
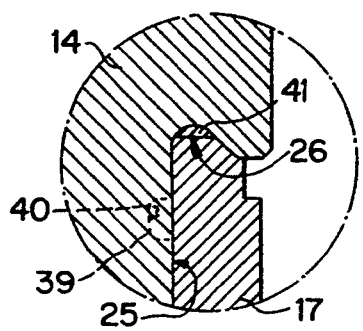
FIG. 15 is a view similar to FIG. 14 and illustrates yet another embodiment of the invention.

It is of course equally possible to provide a sealing ring in the various embodiments shown in FIGS. 1 to 11. For example, and as shown in FIG. 15, a sealing ring 41 (which may for example be in the form of a suitable sealing compound applied in paste form), is disposed in the groove portion 26 of the crown ring 14 itself, this groove portion 26 being here of course circumferentially continuous. Alternatively, or in addition, and as indicated in broken lines in FIG. 15, it is also possible to provide a sealing ring 39 in a groove 40 of the crown ring 14, as in FIG. 14.

The present invention is not limited to the embodiments and the method of manufacture described above and shown in the drawings, but embraces any modification and/or combination of these.

In the application given by way of example of the invention to a torsion damper, the method of making a sealed assembly of two components by working in plastic flow in accordance with the invention is of particular advantage. This is firstly because, by ensuring sealing, the method enables grease to be put into the corresponding chamber between the base plate 16 and cover plate 17. Secondly, since it is a form of cold working it does not have the disadvantages of welding. In this connection, the first of these two advantages enables the contacts which are more or less inevitable during service between the resilient members 11 and the crown ring 14 (especially since these resilient members 11 are springs of considerable circumferential length) to be always properly lubricated. As to the other advantage, the heat involved in welding tends to lead to undesirable melting of the grease.

The disadvantages of riveting are also avoided, in that additional space and therefore bulk would have to be provided in order to accommodate the necessary rivets. The economy in size thus realised by the arrangement of the present invention therefore enables the springs 11 to be arranged on a pitch circle of increased diameter (everything else being equal), and this in turn enables an increased torque to be transmitted.

The field of application of the present invention is, however, not limited only to torsion damping arrangements for motor vehicles. It can equally well be used wherever two coaxial components are to be assembled together, in any other context.

What is claimed is:

1. A method of assembling a transverse plate with an axially elongated crown ring of a torsion damper, said transverse plate and said crown ring being coaxially mounted on a common axis, said crown ring having an annular shoulder which is disposed generally radially with respect to said common axis, said transverse plate having an outer peripheral portion of larger diameter than the shoulder, said outer peripheral portion abutting said transverse plate and being secured to the crown ring both axially and circumferentially, wherein said method comprises the steps of:

preforming on the crown ring a continuous circumferential groove adjacent the outer periphery of the annular shoulder of said crown ring, said groove being open radially inwardly toward said common axis;

applying the transverse plate against said annular shoulder of said ring;

working said transverse plate by application of an axial force on said transverse plate, along said common axis, against said crown ring, thereby causing the material of said transverse plate to radially invade at least part of said continuous circumferential groove in plastic flow, thereby providing sealing means for sealing the assembly of said transverse plate and said crown ring, wherein said continuous groove comprises a base and two flanks, at least one of said flanks being oblique whereby the material of said transverse plate is displaced toward the groove during the working operation.

2. The method according to claim 1, wherein both of said two flanks are oblique.

3. The method according to claim 2, wherein the peripheral portion of the shoulder extends obliquely with respect to the base of the groove.

4. A method of assembling a transverse plate with an axially elongated crown ring of a torsion damper, said transverse plate and said crown ring being coaxially mounted on a common axis, said crown ring having an annular shoulder which is disposed generally radially with respect to said common axis, said transverse plate having an outer peripheral portion of larger diameter than the shoulder, said outer peripheral portion abutting said transverse plate and being secured to the crown ring both axially and circumferentially, wherein said method comprises the steps of:

preforming on the crown ring at least one groove portion adjacent the outer periphery of the annular shoulder of said crown ring, said groove portion being open radially inwardly toward said common axis;

applying the transverse plate against said annular shoulder of said crown ring;

working said transverse plate by application of an axial force on said transverse plate, along said common axis, against said crown ring, thereby causing the material of said transverse plate to radially invade at least part of said groove portion in plastic flow, thereby providing sealing means for sealing the assembly of said transverse plate and said crown ring, wherein said groove portion comprises a base and two flanks, at least one of said flanks being oblique whereby the material of said transverse plate is displaced toward the groove portion during the working operation.

5. The method according to claim 4, wherein both of said two flanks are oblique.

6. The method according to claim 5, wherein the peripheral portion of the shoulder extends obliquely with respect to the base of the groove portion.

7. The method according to claim 12, wherein the crown ring comprises a plurality of groove portions disposed along a circumference of said crown ring.

* * * * *